Oct. 6, 1925.

J. NORTHROP 1,556,247

SHUTTLE BOX TENSION CONTROLLING MECHANISM FOR LOOMS

Filed Dec. 1, 1924

Witness:
Alfred H. McGlinchey.

Inventor:
Jonas Northrop
by his attorneys

Patented Oct. 6, 1925.

1,556,247

UNITED STATES PATENT OFFICE.

JONAS NORTHROP, OF HOPEDALE, MASSACHUSETTS, ASSIGNOR TO HOPEDALE MANUFACTURING COMPANY, OF MILFORD, MASSACHUSETTS, A CORPORATION OF MASSACHUSETTS.

SHUTTLE-BOX TENSION-CONTROLLING MECHANISM FOR LOOMS.

Application filed December 1, 1924. Serial No. 753,017.

*To all whom it may concern:*

Be it known that I, JONAS NORTHROP, a citizen of the United States, residing at Hopedale, in the county of Worcester and State of Massachusetts, have invented certain new and useful Improvements in Shuttle-Box Tension-Controlling Mechanism for Looms; and I do hereby declare the following to be a full, clear, and exact description of the invention, such as will enable others skilled in the art to which it appertains to make and use the same.

The present invention relates to an improvement in shuttle box tension controlling mechanism for looms.

The object of the invention is to produce a new form of tension controlling mechanism operating to cause the tension on the shuttle to be greater at one part of the movement of the lay than at another. To this end the present invention consists in the mechanism hereinafter described and particularly defined in the claims.

Figure 1:
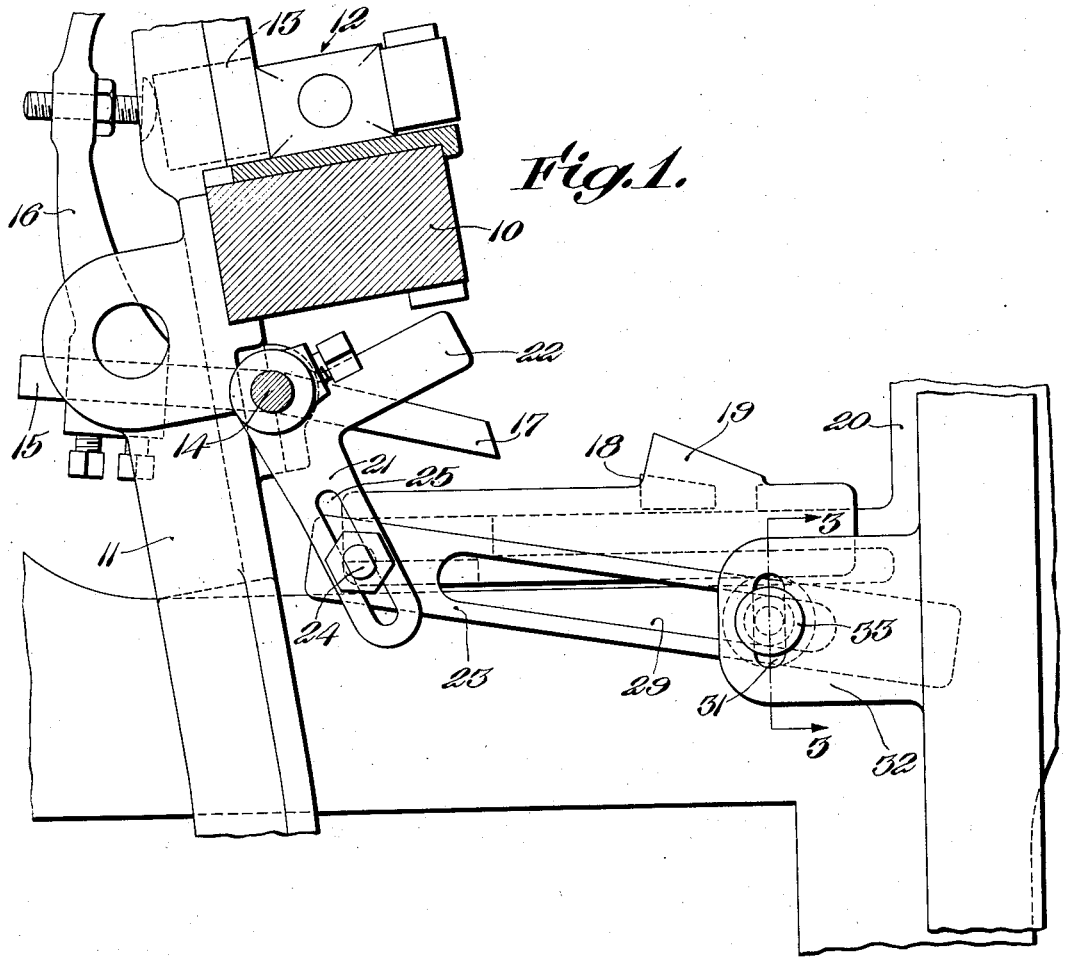
Figure 2:
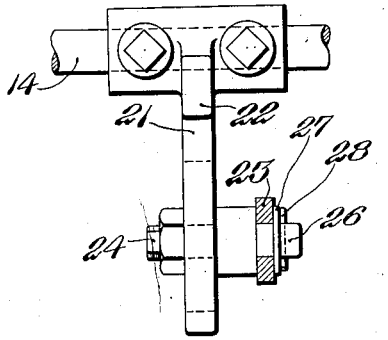
Figure 3:
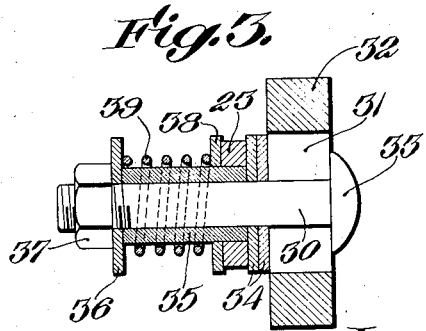

In the accompanying drawings illustrating the preferred form of the invention, Fig. 1 is a sectional elevation of a part of a loom illustrating the invention; Fig. 2 is a front elevation of the control arm; and Fig. 3 is a section on the line 3—3, Fig. 1.

The illustrated embodiment of the invention is described as follows: The lay 10, supported by the swords 11, has the shuttle box 12 and binder 13 of the usual form. Under the lay is supported the dagger shaft 14, which is carried by the lay. On an arm 15 of the dagger shaft 14 are secured the binder fingers 16 which bear against and apply pressure to the binders 13 to create the necessary shuttle box tension. The dagger shaft also carries a dagger 17 adapted to engage the steel 18 supported in the frog 19 carried by the loom frame 20 in any usual or convenient manner. Secured on the dagger shaft is the control arm 21, which is provided with a dagger stop 22 for preventing overthrow of the dagger away from the steel. To the control arm 21 is pivotally attached the link 23. A bolt 24 is secured in the slot 25 of the control arm 21, and on a reduced end 26 of this bolt the link 23 is received, being held in place by the washer 27 and cotter pin 28. The link 23 is slotted at 29. This slot embraces the bolt 30 which is received in the slot 31 in the bracket 32 on the frame 20 of the loom. This bolt 30 is provided with a head 33 which engages the outside of the bracket and extends through the slot 31 and first receives two washers 34, then a spacer sleeve 35, washer 36 and nut 37. The link 23 lies next to the outer one of the two washers 34, and on the other side of the link 23 is the washer 38. A spring 39 is interposed between the washers 36 and 38, and when the nut 37 is screwed up tight, it engages the spacer sleeve 35 and is securely held in place thereby, causing a frictional pressure to be exerted upon the link 23 by the spring 39.

Assuming the parts to have the positions which they occupy at the back center with the lay in rearward position, as shown in Fig. 1, the lay starts forward, and as it begins to move forward the link resists forward movement to the extent of the friction exerted thereon by the friction device described, after which it moves forwardly under the resistance of the friction. Until movement of the link begins, the tension on the shuttle is increased, owing to the fact that the friction of rest is greater than the friction of motion. Ordinarily, however, this difference is not large, and during the entire time that the lay is moving forward, the friction device causes a substantially uniform amount of pressure to be exerted on the binder fingers by the binder. At the end of the forward movement when the lay arrives at front center, the conditions change, and on the backward movement of the lay from front center through top center to back center, the friction device operates to exert a pull upon the binder fingers, tending to withdraw them from contact with the binders. As a result of this construction the shuttle tension is reduced from front center to back center, and is increased from back center to front center, so that during picking, which is at or near top center, the shuttle tension is diminished, and during boxing, which is somewhere between back center and bottom center, the tension is increased.

Having thus described the invention, what is claimed is:

1. Shuttle box tension controlling mechanism for looms having, in combination, a lay, shutter boxes on the lay, binders for the boxes, means for applying pressure to the binders, and friction means acting during forward movement of the lay to increase the shuttle tension, and during rearward movement of the lay to decrease the shuttle tension.

2. Shuttle box tension controlling mechanism for looms having, in combination, a lay provided with shuttle boxes, binders for the boxes, means for applying pressure to the binders having frictional connection with the stationary part of the loom for causing greater pressure to be exerted upon the binders while the lay is moving forward, and a lesser pressure while the lay is moving rearward.

In testimony whereof I have signed my name to this specification.

JONAS NORTHROP.